Figure 5:
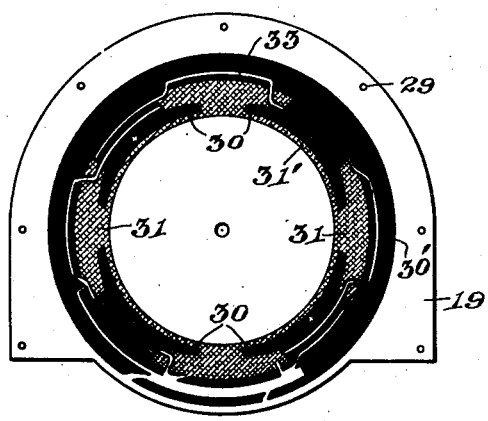

May 7, 1940.  W. W. GEISER  2,200,060
FLOW VISUALIZER
Filed Feb. 20, 1939  4 Sheets-Sheet 1
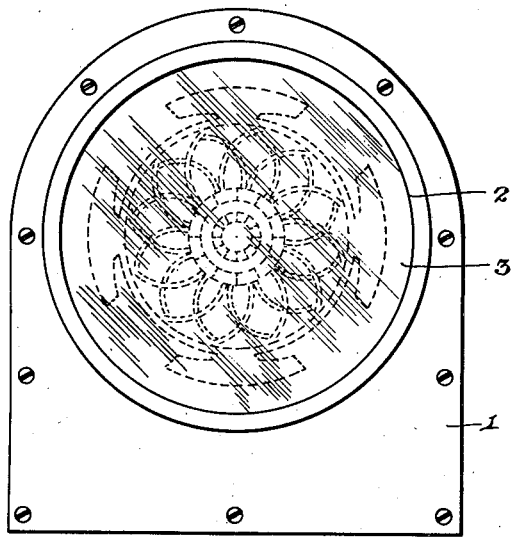
Fig. 1.
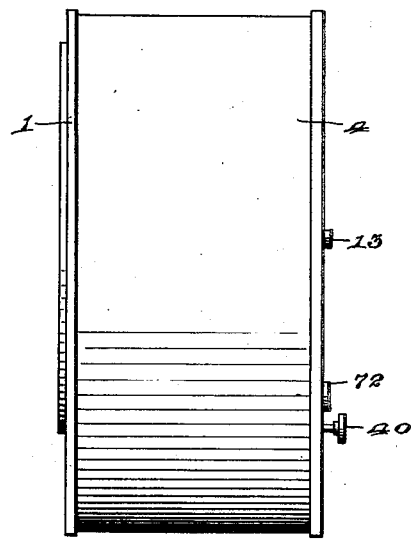
Fig. 2.
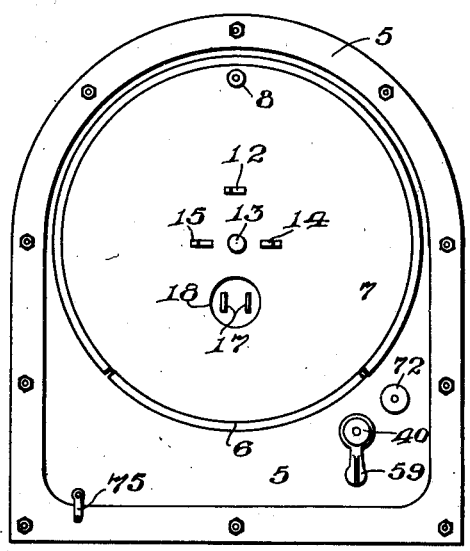
Fig. 3.
Fig. 4.
INVENTOR
Walter W. Geiser,
BY J. Stuart Freeman.
ATTORNEY May 7, 1940.  W. W. GEISER  2,200,060
FLOW VISUALIZER
Filed Feb. 20, 1939  4 Sheets-Sheet 2

INVENTOR
Walter W. Geiser,
BY
J. Stuart Freeman.
ATTORNEY

May 7, 1940. W. W. GEISER 2,200,060

FLOW VISUALIZER

Filed Feb. 20, 1939 4 Sheets-Sheet 3

INVENTOR
Walter W. Geiser,
BY
ATTORNEY

May 7, 1940.  W. W. GEISER  2,200,060
FLOW VISUALIZER
Filed Feb. 20, 1939  4 Sheets-Sheet 4

INVENTOR
Walter W. Geiser,
BY
ATTORNEY

Patented May 7, 1940

2,200,060

UNITED STATES PATENT OFFICE 2,200,060

FLOW VISUALIZER

Walter W. Geiser, Philadelphia, Pa.

Application February 20, 1939, Serial No. 257,273

15 Claims. (Cl. 35—13)

The object of the invention is to provide, in its broadest sense, a device for showing visually, by simulation, the invisible phenomena incident to the production and/or use of electric currents and magnetic flux, with especial reference to rhythmical, cyclical, or continuous movement through given paths, channels, and conductors, such as the passage of magnetism through air, iron, steel, or other medium, the "flow" of electricity along a wire or other conductor, et cetera, wherefore the term "flow" will hereinafter be understood as applying to these and similar actions or phenomena.

Originally, the impelling motive for inventing or designing the present device was to better enable instructors in electricity to visually demonstrate the flow of electric current through the conductors of direct and alternating current motors and generators, and all types of electrical apparatus broadly, and to enable students to better understand such flow and the resulting phenomena.

Another and more specific object is to provide basically a plurality of transparent sheets, which for convenience are usually made of circular shape and are therefore hereinafter referred to as discs, with the understanding that this term is intended generically to include all shapes of sheets, and also regardless of whether they are mounted so as to be stationary, to rotate with respect to another, oscillate in an arc, reciprocate in a straight line, or move in any combination of these directions, while each such disc may carry indicia of such color and arrangement with respect to a disc or discs in front or to the rear thereof, that its indicia or a portion of the same is either visible through or is absorbed by the indicia upon the frontal or rearward disc or discs, as the case may be, for such length of time or distance of movement as may be necessary in order to produce the desired effect.

A further object is to provide in such a construction a disc having substantially radially extending areas, such as narrow stripes to represent electric conductors, fluid-conducting pipes, or the like, in combination with a rearward disc having angularly or spirally arranged lines, which, by showing through the said stripes while the forward disc is moving with respect to the rearward disc, results in producing in effect a radial movement of an electric current or fluid in such "conductors" or "pipes" as the case may be.

Still another object is to make use of color transmission and absorption in such a manner, that, with a minimum of discs or equivalent parts, the greatest variety of effects can be obtained, as such discs are moved with respect to one another; and, when necessary, to provide for periodical change in such relative movement, so as to produce effects that cannot be obtained by a continuous motion between the said discs, as well as providing different colors for such indicia, so selected that two distinct colors will be visible simultaneously, or either one or the other alone will be visible at a given time, or one will cooperate at times with the other so as to produce a third color, having the desired direction and degree of motion herein referred to.

Figure 6:
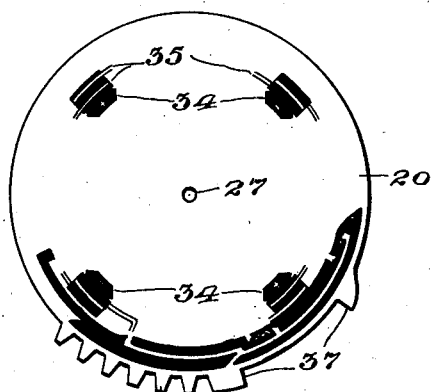
Figure 7:
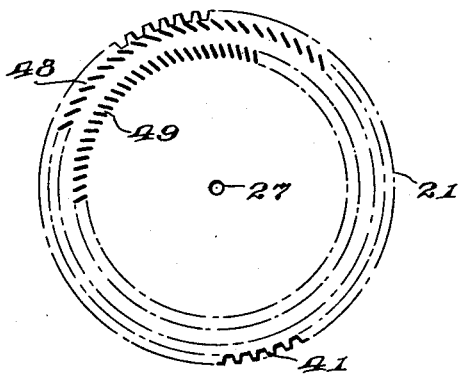
Figure 8:
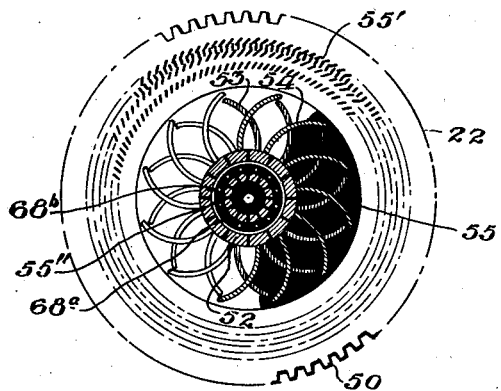
Figure 9:
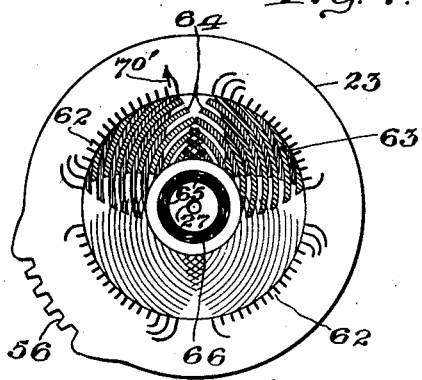
Figure 10:
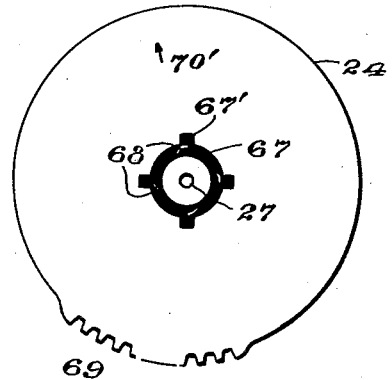
Figure 11:
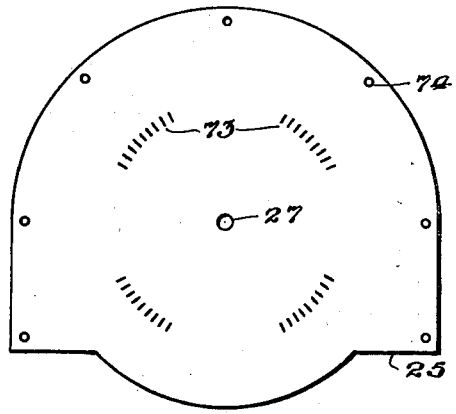
Figure 12:
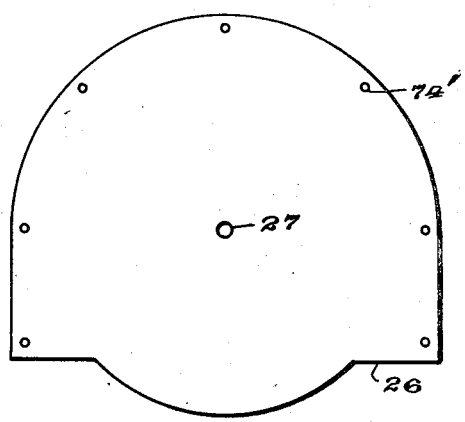
Figures 13, 14:
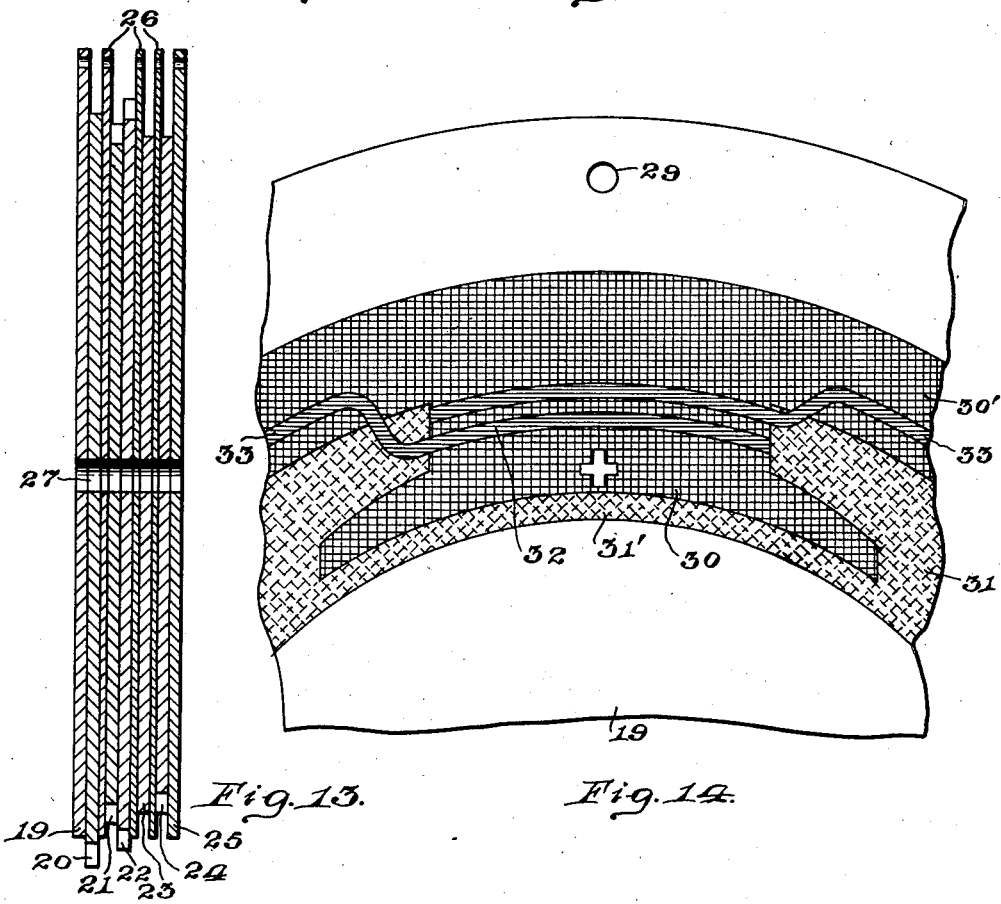
Figure 15:
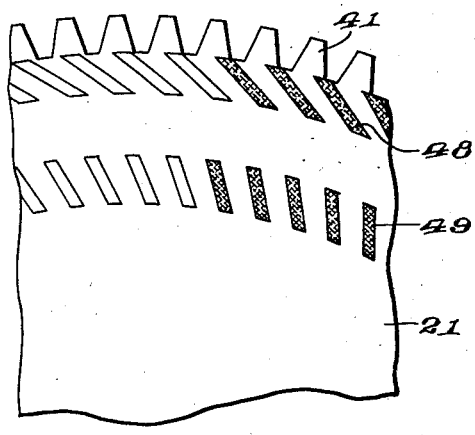
Figure 16:
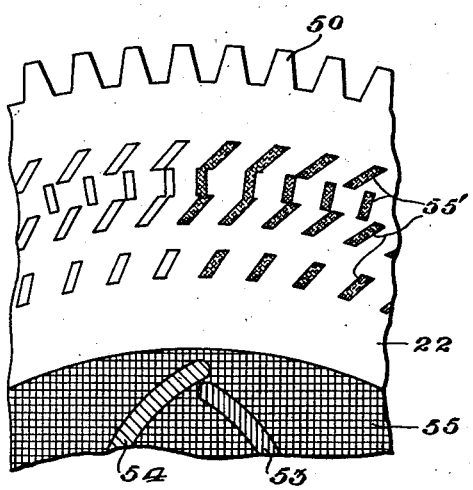
Figure 17:
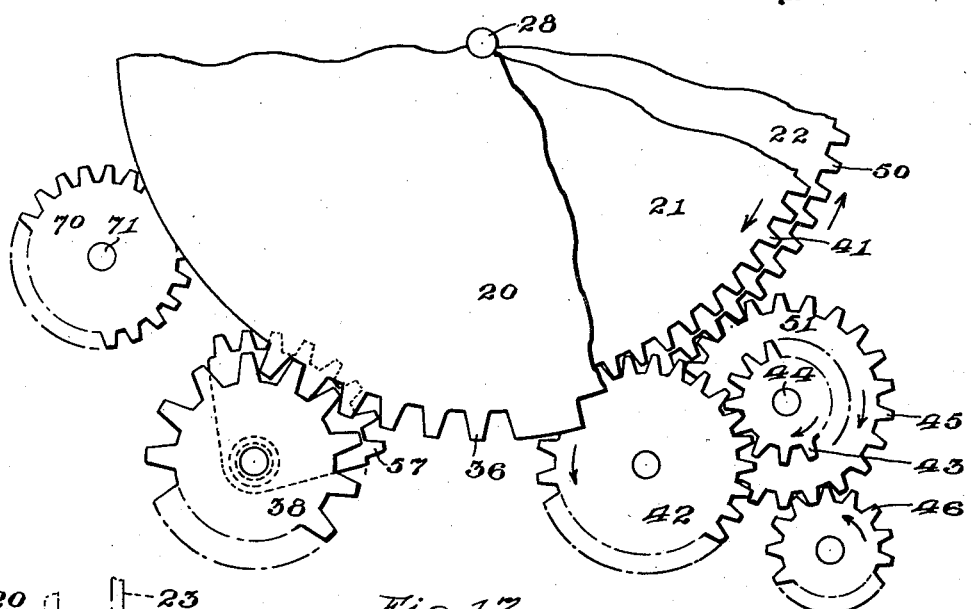
Figure 18:
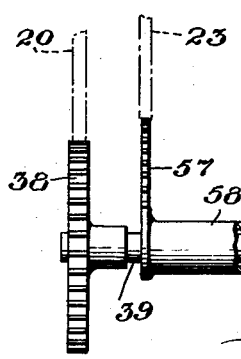

With the objects thus briefly stated, the invention comprises further details of construction and operation, which are hereinafter fully brought out in the following description, when read in conjunction with the accompanying drawings, in which Fig. 1 is a front elevation of a device comprising one embodiment of the invention; Fig. 2 is a side elevation of the same; Fig. 3 is a rear elevation of the same; Fig. 4 is a central vertical section of the same; Fig. 5 is a plan view of the stationary first disc within the front wall of the device; Fig. 6 is a plan view of the next disc toward the rear of said first disc and is itself manually adjustable axially; Fig. 7 is the next disc toward the rear and one which is rotatable in a clockwise direction; Fig. 8 is a plan view of the next disc toward the rear and is one which normally rotates axially in a counterclockwise direction; Fig. 9 is a plan view of the next disc toward the rear, and one which, while angularly adjustable, is normally stationary; Fig. 10 is a plan view of the next disc toward the rear and one which is also angularly adjustable but normally stationary; Fig. 11 is a plan view of the next and last disc toward the rear, the same being stationary; Fig. 12 is a plan view of one of three stationary blank spacer discs; Fig. 13 is an enlarged vertical diametrical section through the several discs operatively assembled; Fig. 14 is an enlarged fragmentary detailed plan view of one of the "pole pieces" and adjacent parts shown in Fig. 5; Fig. 15 is an enlarged fragmentary plan view of a portion of the disc shown in Fig. 7; Fig. 16 is a similar view of a portion of the disc shown in Fig. 8; Fig. 17 is a semi-diagrammatic view showing portions of the discs illustrated in Figs. 6, 7, and 8, together with means for oscillatably adjusting and rotating the same; and Fig. 18 is a fragmentary side elevation of the two concentric shafts by means of which the discs of Figs. 6 and 9 are adjusted relative to the disc shown in Fig. 5 and to each other.

Referring to the drawings, the casing of the device herein illustrated as comprising one embodiment of the invention, consists in a frontal wall 1 having an annular aperture 2 in its upper portion, spanned by a transparent closure 3, an inner wall or frame 3a, having an annular aperture in its upper portion spanned by a frosted or other suitable form of diffusing, transparent closure 3b, similar in other respects to the transparent closure 3 in the frontal wall, said inner frame being otherwise similar to the frontal wall 1 and said front wall and inner frame serving to confine the discs and their driving gears in operative position, as well as providing a means for mounting the driving mechanism 16 and 47. Said casing also comprises an inverted U-shaped side wall 4, spanned by a bottom wall 4', and a rearward wall 5 which in turn is provided with an opening 6, normally spanned by a removable closure 7, which may be locked in operative position by means of a suitable latch 8. Upon the inner side of this rear closure 7 is mounted a housing 9, which serves as a support for electric lamps 10, all wiring connections, and a rheostat 11, said rheostat being controlled by an on-and-off switch 12, extending through said closure and also controlled, as to the resistance which it offers to an electric circuit, by means of a manually adjustable knob 13, also extending through the rear of said closure. A light-controlling switch 14, also contained within the housing 9, extends through said rear closure, while through the same closure extends an additional switch 15, which controls the motor 16 positioned within the lower portion of said casing. In addition thereto, any well known form of electrical contacts 17 are accessible through an aperture 18 in said rear closure for transmitting current from an extraneous source to the mechanism within said casing.

Referring now to Figs. 5 to 18 of the drawings, and particularly to Figs. 5 to 13 thereof, a group of discs are assembled as shown in Fig. 13 and are individually illustrated in Figs. 5 to 12 inclusive. These discs are numbered 19, 20, 21, 22, 23, 24, and 25, while through spacer discs 26 are preferably positioned between the first named discs 20 and 21, 22 and 23, and 23 and 24. All of these discs are of transparent material, except as otherwise herein noted, so that said spacer discs 26 for instance, are as the term implies, merely for the purpose of separating from each other adjacent discs which rotate or are adjustable axially with respect to each other.

As hereinbefore stated, the device may be made to illustrate many different things or operations, but for purposes of illustration it is here shown as illustrating the operation of either a direct current motor or generator having four poles, although the same principles may be applied to illustrate the flow of curent through the conductors in an alternating current motor or generator, in either case having any feasible number of poles, as well as in many other devices. Having this in mind, the series of discs are as follows, all of said discs being provided with a central aperture 27, through which extends a shaft 28 upon which said discs are mounted for the purpose of maintaining them at all times in axial alignment.

The stationary disc 19 of Fig. 5 is provided peripherally with apertures 29 for securing said disc in fixed relation with respect to the surrounding casing. This disc is also provided with four opaque silhouettes 30, indicating pole pieces connected together by a similarly opaque frame 30', the circumferentially intervening and immediately adjacent radially inner areas 31 and 31' of which disc are orange colored, while a pair of parallel light blue colored lines 32 circumferentially across alternate positive pole pieces and single similar lines across the intervening negative pole pieces, represent a conductor wound about the same, and the conductors about the said pole pieces being connected by intervening similarly colored wire-indicating lines 33. Each pole piece may be, and here is, also appropriately marked with its characteristic positive or negative magnetic sign, and it is to be understood that the orange and blue coloring of the various areas is purely arbitrary, as other colors might be used instead.

The disc 20 of Fig. 6 is provided with circumferentially spaced opaque, alternately positioned, positive and negative interpole piece representations 34, together with light blue conductor-indicating lines 35 crossing them. This disc 20 is also provided peripherally with a segment of gear teeth 36 and with a pair of spaced lugs 37, said gear teeth being in mesh with a small gear 38 carried by a shaft 39 which extends through the rear wall 5 of the casing and is provided with a manually rotatable knob 40, while said lugs cooperate alternately with a fixed lug or pin to limit angular movement of this disc. Thus, by rotating said knob and thereby the disc 20 with respect to the stationary disc 19, the pole pieces 34 are adapted to be shifted from an obscure position to the rear of the first-mentioned pole pieces 30 of said last mentioned disc into intermediate positions between said last-mentioned pole pieces and vice versa, and the conductor indicating lines 35 being so arranged that when the interpoles 34 are between the fixed poles 30, their respective conductors are in proper relationship to show a continuous course for the flow of an electric current around them.

The disc 21 of Fig. 7 is provided peripherally with gear teeth 41, which mesh with a gear 42, driven by a pinion 43 carried by a shaft 44, which also supports a gear 45, in turn rotated by a gear 46, driven by the motor 16 through an intervening reduction gear within and represented by the gear box 47. This disc 21 is completely transparent, except for two rows 48 and 49 of circumferentially spaced angularly related lines, preferably of orange color in the construction being at present considered, and these lines being visible as substantially black spaced lines rotatable circumferentially and to the rear of the conductor-indicating blue lines crossing the negative pole pieces, while being invisible to the rear of the similarly colored orange regions 31, for the reason that similarly colored areas do not show up in contrast when one is viewed through the other, but show up in marked contrast of a third color or black when two areas of complementary color are viewed one through the other. Thus, clockwise rotation of the disc 21 with respect to the discs 19 and 20 clearly shows series or chains of transversely extending dark, even blackish lines or other form of spots or figures across the conductor-indicating light bluish lines of the negative fixed pole and interpole pieces hereinbefore referred to, moving along said bluish lines and representing current flow in said conductor-indicating light blue lines.

The disc 22 of Fig. 8 is provided peripherally with gear teeth 50, which mesh with a gear 51, also carried by the shaft 44 and driven by the motor 16, but in a counter-clockwise direction. This disc is provided centrally with concentric rings of commutator segment-indicating areas 52, preferably in a brown or characteristic copper color, and from each of these segments radiate oppositely curved pairs of conductor-indicating lines 53 and 54, which are preferably colored respectively red and green, the space between said lines being opaque, as indicated. Radially outwardly from these pairs of conductor lines which represent the windings of the armature 55 of the motor or generator, as the case may be, there is positioned a radially spaced series of circumferentially spaced diagonally extending lines 55', preferably of orange color, which being to the rear of the windings upon the positive poles and connecting portions of the frame 30', indicate the flow of current in the opposite direction to that indicated by the movement of the orange colored lines on the disc 21, by reason of their different radial distances from the center and the relatively opposite directions in which the discs 21 and 22 normally rotate. By this system of alternate transmission and absorption of lines of the same and different colors, and their respective circumferential motion, current is indicated as flowing in a counter-clockwise direction through each of the two bluish lines upon each of the two positive pole pieces in Fig. 5, while current is indicated as flowing in a clockwise direction through the single bluish line on each of the two negative pole pieces in that figure, and in the proper corresponding directions throughout the other portions of the bluish conductor-indicating lines of said discs 19 and 20, and representing the flow of current through the field circuit of a motor or generator. This disc 22 also provides transparent spots 68a and a transparent circle 68b in an otherwise opaque ring 55''; said ring, together with similar rings 66 and 67 on disc 23 and 24, representing an exaggerated periphery of the surface only of commutator 52; being exaggerated in width to afford space for spots 68a and circle 68b on disc 22, and spots or lines 65 and 68 on the rings 66 and 67 of discs 23 and 24 respectively. These transparent spots or areas provide a means for the passage of spark-indicating flashes hereinafter described.

Disc 23 of Fig. 9 is provided at one point upon its periphery with a segmental rack 56, which is in engagement with a rack 57 carried by a tubular shaft 58 surrounding and concentric with the the shaft 39, said tubular shaft also extending through the rear wall 5, and being provided with a manually engageable lever 59 and also with a lug 60, the opposite sides of which cooperate with a pin 61, carried by the shaft 39 to limit one of these shafts with respect to the other. Radially inwardly from its periphery this disc 23 is provided with series of generally radially extending lines 62, which are visible through the orange areas 31 and 31' upon the disc 19 and indicate the relative position and directions taken by the normal lines of magnetic force flowing between the pole pieces 30 and the armature 55 of the disc 22. The disc 23 is also provided radially inwardly with green and red fan-shaped areas 63, corresponding in circumferential position with each of the fixed pole pieces 30, these areas being formed by diagonally outwardly extending spaced parallel green and red colored lines 64, with the result that as the respective red and green lines of disc 22 pass in front of the oppositely colored green and red lines of disc 23, spaced dark or even blackish lines appear in the former to move relatively outwardly in one set of armature conductor-indicating lines and inwardly in the other set of such lines, so as to thereby produce the effect of a continuous flow of electric current through a portion of the armature conductors connected to the several commutator segments 52, said flow being in one direction in those conductors under the influence of magnetic lines 62 under positive poles and in the opposite direction in those conductors under the influence of magnetic lines 62 under negative poles, while no spots appear on conductors in the neutral zone between poles, indicating that no current flows in these conductors at that time. It will also be noted that the disc 23 is provided with two closely associated circumferential rows of short transparent lines 65 in an otherwise opaque ring 66, previously referred to as one of three similar rings comprising the representation of the exaggerated periphery of the surface of commutator 52, for the purpose described in the following paragraph.

The disc 24 in Fig. 10 is substantially entirely plain and uncolored, but is provided adjacent to its center with a circular area 67, which, as previously explained, is one of three parts which, together, represent the exaggerated periphery of the commutator surface, and projecting radially from the area 67 are four extensions 67', representing brushes bearing upon the commutator surface. Both the circular area 67 and extensions 67' are opaque except for angularly shaped circumferentially positioned transparent lines or spots 68, while the periphery of this disc is provided with rack teeth 69 in mesh with a gear 70 carried by a shaft 71, which extends through the rear wall 5 of the case and is provided with a manually engageable knob 72. By shifting the disc 23 with respect to the disc 19, magnetic lines 62 and colored lines 64 are shifted forward and lines 62 uncover additional magnetic lines 73 referred to in the following paragraph, to represent the altered position and number of the lines of magnetic force when the motor is under heavy load, while the shifting of lines 64 represents the forward shift of the neutral point under this condition. Shifting disc 23 in this manner brings a portion of transparent lines, spots, or other shaped figures 65 and 68 into register, while the rotation of disc 22 brings some of the transparent apertures 68a in the ring 55'' into periodical register to permit light to pass, so that the resulting momentary flashes of light indicate sparks at the commutator 52. Shifting disc 24 forward by means of knob 72, shaft 71, et cetera, moves the brushes 67' and lines or spots 68 to a position corresponding to the new neutral position; the spots 65, 68 and 68a no longer being in register and the sparking accordingly ceasing. However, by then rotating slightly the disc 20, so that the interpoles 34 are brought into operative position between the fixed poles 30, disc 23 is automatically returned to almost its original position, just sufficiently short of or beyond that position to permit lines 73 on disc 25 to occupy spaces intermediate between lines 62 on disc 23, to show additional magnetic lines incident to increased load. This movement also brings the lines 63 on disc 23 to practically their original position, but with the brushes 67' on disc 24 still in their advanced position, spots 65, 68 and 68a are again in register and spark-indicating flashes denote that the brushes are again out of neutral position. Shifting disc 24 backward by means of knob 72, moves the brushes 67' to their correct neutral position, the previously registered spark-indicating lines or apertures are again covered by opaque portions of the rings 66 and 67, and sparking ceases, showing that the proper positioning of brushes and interpole pieces eliminates sparking under conditions of previous overload when only main pole pieces 30 were in operative position. However, by shifting disc 24 independently of any other disc, brushes 67' may be moved backward or forward of the correct neutral position and will "spark"; while moving the brushes to an advanced forward position will bring into register another portion of spots 65 and 67 with transparent circle 68b, which then shows the commutator end of brushes 67' as in an overheated or "glowing" condition, while the "sparking" is intensified. Returning the brushes to their correct neutral position stops the sparking and glowing, indicating that the correct positioning of the brushes is essential for sparkless commutation, whether interpoles are, or are not, used. The discs 23 and 24 are also preferably provided with opaque neutral position-indicating arrows 70' and 70", to show when brushes 67' are in their correct neutral position.

The last disc 25 (Fig. 11) progressively to the rear of the series is in outline shaped the same as the first described stationary disc 19, and is entirely transparent except for a series of circumferentially spaced radially extending lines 73, which under light load conditions are concealed behind a portion of the lines of force 62, between the fixed pole pieces 30 and the rotatable armature of the device indicated by the central portion of the disc 22, but which are exposed under heavy load conditions, as explained in the preceding paragraph. This disc 25 is, therefore, also provided with means 74 for fixedly securing it with respect to the surrounding casing. The discs 26 (Fig. 12), of which there are three, are shaped similarly to discs 19 and 25, and also provided with means 74' for fixedly positioning them, but are completely transparent and are positioned as hereinbefore described and as illustrated in Fig. 13. Furthermore, while the assembled discs are shown in Fig. 13 as being closely adjacent to one another, it is to be understood that washers or other suitable means may be employed in order to space them slightly apart, and thereby prevent them from scratching or otherwise wearing one another's surfaces. It is also to be understood, that instead of depending at all times upon the motor 16 to rotate said discs, they may be manually rotated as slowly as desired by means of a small crank 75, carried by the rearwardly projecting end of a shaft 76, which at its opposite end carries a gear 77 in mesh with the motor driven gear 45, or by any other arrangement that may be desired.

As to the detailed construction of the device, it is to be understood that the appended claims are intended to cover the broad principles involved, and that the direct current motor or generator structure herein shown is merely illustrative of one application of such principles.

Having thus described my invention, what I claim as new and desire to protect by Letters Patent of the United States is:

1. A device for visually representing the flow of electric currents through the conductors of an electro-magnetic generator or motor, a plurality of transparent discs movable with respect to each other, one of said discs carrying indicia in a given color, and another of said discs carrying indicia of the same and also of a complementary color, so that the said indicia of the first disc is absorbed by and invisible through the same color, and unabsorbed by and visible as a third color through the complementary color portion of the second disc.

2. A device for visually representing the flow of electric currents through the conductors of an electro-magnetic generator or motor, a plurality of transparent discs movable with respect to each other, one fixed disc carrying opaque indicia representing the fixed portions of an apparatus and semi-transparent indicia of one color representing electrical- or fluid-conductors operatively related to said fixed portions and also semi-transparent indicia of a second color, and a second disc movable with respect to said first disc and carrying indicia of said second color in paths aligned with the colors upon the first disc, so that the indicia upon the second disc shows as a third color through and represents flow in said conductors, while being absorbed and invisible as it passes the similarly colored portions of said first disc.

3. A device for illustrating the flow of current through the conductors of an electrical apparatus, such as a motor, generator, or the like, comprising a fixed disc carrying opaque indicia to represent the fixed portions of the apparatus such as the pole pieces and semi-transparent indicia representing the conductors characteristically associated with said fixed portions and having surrounding areas of a second semi-transparent color, and a second disc movable with respect to said first disc and carrying semi-transparent indicia of said second color, which shows as a third color and thereby visualizes flow of current through the conductor-representing portions of the first disc, while being absorbed and thereby invisible while in registry with the similarly colored portions of said first disc.

4. A device for visually representing the flow of electric currents through the conductors of an electro-magnetic generator or motor, a pair of relatively rotatable discs, one of which is provided with substantially circumferentially extending semi-transparent lines of a given color, and the other disc being provided with spaced figures of a different semi-transparent color arranged in a path substantially concentric with the lines upon said first disc, whereby said figures appear as a third color and visualize movement along the lines of said first disc.

5. A device for visually representing the flow of electric currents through the conductors of an electro-magnetic generator or motor, a pair of relatively rotatable discs, one of which is provided with substantially circumferentially extending semi-transparent lines of a given color, interrupted by intervening areas of a second semi-transparent color which is complementary to the first color, and the other disc being provided with spaced figures of the same color as the said intervening areas of said first disc and in a path substantially concentric with the lines of said first disc, whereby said figures when abreast of said lines appear as a third color and visualize movement along the lines of the said first disc but are absorbed by and become invisible when passing abreast of the intervening spaces of said first disc.

6. A device for visually representing the flow of electric currents through the conductors of an electro-magnetic generator or motor, a pair of relatively rotatable discs, one of which is provided with substantially radially extending semi-transparent lines of a given color, and the other disc being provided with circumferentially spaced lines of a second color complementary to the first color, spirally arranged so as to angularly intersect the lines upon the first disc, and visualize radial movement of a third color and corresponding flow along said first lines.

7. A device for visually representing the flow of electric currents through the conductors of an electro-magnetic generator or motor, a pair of relatively rotatable discs, one of which is provided with two sets of substantially radially extending semi-transparent lines of two complementary colors, and the other disc being also provided with two sets of semi-transparent lines spirally arranged, and respectively of the opposite colors to the colors of the lines upon said first disc, whereby relative rotation of said discs effects a visual radial movement of a third color and corresponding flow, radially outwardly along one set and inwardly along the other set of lines upon said first disc.

8. A device for visualizing the flow of current through the conductors of an electrical apparatus such as a motor or generator, comprising a fixed transparent disc carrying opaque silhouettes of the field pole pieces crossed by semi-transparent conductor-indicating lines of a given color and adjacent areas of a second color, and a second disc rotatably associated with the first disc and carrying spaced semi-transparent figures of said second color and movable in the path of said conductor-indicating lines upon the first disc, so as to show therethrough in a third color and thus indicate the flow of current therethrough, and when moving past intervening areas between said pole pieces said figures being absorbed by similarly colored areas on the first disc.

9. A device for visualizing the flow of current through the conductors of an electrical apparatus such as a motor or generator, comprising a fixed transparent disc carrying opaque silhouettes of the field pole pieces crossed by semi-transparent conductor-indicating lines of a given color and adjacent areas of a second color, and a second disc rotatably associated with the first disc and carrying spaced semi-transparent figures of said second color and movable in the path of said conductor-indicating lines upon the first disc, so as to show therethrough in a third color and thus indicate the flow of current therethrough, and when moving past intervening areas between said pole pieces said figures being absorbed by similarly colored areas on the first disc, an angularly adjustable disc carrying opaque silhouettes representing inter-pole pieces adapted upon rotation of said third disc to assume intermediate positions between the pole pieces of said first disc, and conductor-indicating lines of the first given color crossing said inter-pole pieces and when in such intermediate positions forming continuations of the corresponding lines of said first-mentioned pole pieces.

10. A device for visualizing the flow of current through the conductors of an electrical apparatus such as a motor or generator, comprising a fixed transparent disc carrying opaque silhouettes of the field pole pieces crossed by semi-transparent conductor-indicating lines of a given color and adjacent areas of a second color, and a second disc rotatably associated with the first disc and carrying spaced semi-transparent figures of said second color and movable in the path of said conductor-indicating lines upon the first discs, so as to show therethrough in a third color and thus indicate the flow of current therethrough, and when moving past intervening areas between said pole pieces said figures being absorbed by similarly colored areas on the first disc, a rotatable disc provided with representations of a commutator and armature, with radially extending arcuate conductor-indicating lines of two colors representing armature windings, and another rotatable disc carrying semi-transparent substantially radially extending lines of colors which are complementary to those of and disposed angularly with respect to said arcuate lines, so as to effect an apparent radially outward and inward flow of current through said armature conductors.

11. A device for visualizing the flow of current through the conductors of an electrical apparatus such as a motor or generator, comprising a fixed transparent disc carrying opaque silhouettes of the field pole pieces crossed by semi-transparent conductor-indicating lines of a given color and adjacent areas of a second color, and a second disc rotatably associated with the first disc and carrying spaced semi-transparent figures of said second color and movable in the path of said conductor-indicating lines upon the first disc, so as to show therethrough in a third color and thus indicate the flow of current therethrough, and when moving past intervening areas between said pole pieces said figures being absorbed by similarly colored areas on the first disc, angularly adjustable disc carrying opaque silhouettes representing interpole pieces adapted upon rotation of said third disc to assume intermediate positions between the pole pieces of said first disc, and conductor-indicating lines of the first given color crossing said interpole pieces and when in such intermediate positions forming continuations of the corresponding lines of said first-mentioned pole pieces, a rotatable disc provided with representations of a commutator and armature, with radially extending arcuate conductor-indicating lines of two colors representing armature windings, and another rotatable disc carrying semi-transparent substantially radially extending lines of colors which are complementary to those of and disposed angularly with respect to said arcuate lines, so as to effect an apparent radially outward and inward flow of current through said armature conductors.

12. A device for visualizing the flow of current through the conductors of an electrical apparatus such as a motor or generator, comprising a fixed transparent disc carrying opaque silhouettes of the field pole pieces crossed by semi-transparent conductor-indicating lines of a given color and adjacent areas of a second color, and a second disc rotatably associated with the first disc and carrying spaced semi-transparent figures of said second color and movable in the path of said conductor-indicating lines upon the first disc, so as to show therethrough in a third color and thus indicate the flow of current therethrough, and when moving past intervening areas between said pole pieces said figures being absorbed by similarly colored areas on the first disc, means to indicate the altered positions and degree of saturation of lines of magnetic force when a load is placed upon the motor or generator and to simultaneously show sparking at the brushes and the surface of the commutator, and means to eliminate such sparking indication upon the shifting of said interpole pieces and/or said brushes into operative intermediate positions between the fixed pole pieces.

13. A device for visually representing the flow of electric currents through the conductors of an electro-magnetic generator or motor, which comprises a relatively fixed disc of transparent material provided with opaque areas representing electro-magnetic cores and other non-conducting portions of such machine, and transparent lines representing electric conductors, a second relatively rotatable disc provided with spaced lines adapted to pass by the conductor-representing lines of said first disc, and means to rotate said discs with respect to each other.

14. A device for visually representing the flow of electric currents through the conductors of an electro-magnetic generator or motor, which comprises a relatively fixed disc of transparent material provided with opaque areas representing electro-magnetic cores and other non-conducting portions of such machine, and transparent lines of a given color representing electric conductors, a second relatively rotatable disc provided with spaced lines of a complementary color adapted to pass by the conductor-representing lines of said first disc, and means to rotate said discs with respect to each other.

15. A device for visually representing the flow of electric currents through the conductors of an electro-magnetic generator or motor, which comprises a relatively fixed disc of transparent material provided with opaque areas representing electro-magnetic cores and other non-conducting portions of such machine, and two sets of differently colored transparent lines representing as many sets of conductors, a second relatively rotatable disc provided with spaced indicia of the same colors as those of the lines of said first disc, indicia of a given color upon the second disc being invisible through similarly colored conductor-representing lines upon the first disc and visible as a third color through the differently colored lines upon said first disc, and means to rotate said discs with respect to one another in such manner as to exactly simulate the passage of electric currents through the conductors during the operation of a generator or motor, except as to speed.

WALTER W. GEISER.